United States Patent [19]
Molter et al.

[11] Patent Number: 6,117,287
[45] Date of Patent: *Sep. 12, 2000

[54] ELECTROCHEMICAL CELL FRAME

[75] Inventors: Trent M. Molter, Glastonbury; Lawrence C. Moulthrop, Jr., Windsor; Robert J. Friedland, Enfield; Mark E. Dristy, Manchester, all of Conn.

[73] Assignee: Proton Energy Systems, Inc., Rocky Hill, Conn.

[*] Notice: This patent is subject to a terminal disclaimer.

[21] Appl. No.: 09/223,609

[22] Filed: Dec. 30, 1998

Related U.S. Application Data

[63] Continuation-in-part of application No. 09/084,662, May 26, 1998.

[51] Int. Cl.[7] .................................................. C25D 3/56
[52] U.S. Cl. ........................ 204/255; 204/257; 204/279
[58] Field of Search .................................. 204/252, 253, 204/255, 256, 257, 258, 263, 265, 266, 279; 205/687

[56] References Cited

U.S. PATENT DOCUMENTS

| | | | |
|---|---|---|---|
| 3,134,697 | 5/1964 | Niedrach | 136/86 |
| 3,297,484 | 1/1967 | Niedrach | 136/86 |
| 4,039,409 | 8/1977 | LaConti et al. | 204/129 |
| 4,124,478 | 11/1978 | Tsien et al. | 204/255 |
| 4,166,143 | 8/1979 | Petrow et al. | 427/115 |
| 4,210,512 | 7/1980 | Lawrance et al. | 204/257 |
| 4,214,969 | 7/1980 | Lawrance et al. | 204/255 |
| 4,233,146 | 11/1980 | Rothmayer et al. | 204/255 |
| 4,272,353 | 6/1981 | Lawrance et al. | 204/283 |
| 4,371,433 | 2/1983 | Balko et al. | 204/228 |
| 4,588,660 | 5/1986 | Shimizu et al. | 429/35 |
| 4,822,460 | 4/1989 | Beaver | 204/98 |
| 5,019,227 | 5/1991 | White et al. | 204/128 |
| 5,173,633 | 12/1992 | Joo et al. | 313/270 |
| 5,187,025 | 2/1993 | Kelland et al. | 429/33 |
| 5,296,109 | 3/1994 | Carlson et al. | 204/129 |
| 5,316,644 | 5/1994 | Titterington et al. | 204/284 |
| 5,324,565 | 6/1994 | Leonida et al. | 428/131 |
| 5,366,823 | 11/1994 | Leonida et al. | 429/34 |
| 5,372,689 | 12/1994 | Carlson et al. | 204/252 |
| 5,441,621 | 8/1995 | Molter et al. | 204/252 |
| 5,466,354 | 11/1995 | Leonida et al. | 204/252 |
| 5,470,448 | 11/1995 | Molter et al. | 204/252 |
| 5,484,512 | 1/1996 | Sasaki et al. | 204/129 |

OTHER PUBLICATIONS

"SPE Water Electrolyzers for Closed Environment Life Support" by J.F. McElroy, T.M. Molter and R.J. Roy (2 pages).

"SPE Hydrogen/Oxygen Fuel Cells for Rigorous Naval Applications" by J.F. McElroy, T.M. Molter and R.N. Sexauer (5 pages).

24th Intersociety Energy Conversion Engineering Conference, IECEC–89, "Development of Low Cost, Carbon–Supported Carbon Monoxide Tolerant Catalysts for Phosphoric Acid and Proton Exchange Membrane Fuel Cell Systems" by J. Kosek, N. Kackley and A. LaConti, pp. 1581 through 1586, no month/year given.

J. Electrochem Soc., vol. 141, No. 8, Aug. 1994, "Mass Transport Phenomena in Proton Exhange Membrane Fuel Cells Using O2/He, O2/Ar, and O2/N2 Mixtures, 1. Experiemental Analysis" pp. 2084 through 2088.

J. Electrochem Soc., vol. 141, No. 8, Aug. 1994, "Mass Transport Phenomena in Proton Exchange Membrane Fuel Cells Using O2/He, O2/Ar, and O2/N2 Mixtures, II. Theoretical Analysis" pp. 2089 through 2096.

*Primary Examiner*—Kathryn Gorgos
*Assistant Examiner*—Thomas H Parsons
*Attorney, Agent, or Firm*—Cantor Colburn LLP

[57] ABSTRACT

A cell frame is for use in an electrochemical cell wherein the cell frame includes fluid communicating inserts for providing process water to the electrochemical cell and to transport waste water and product from the cell. The cell frame comprises inserts positioned about the periphery of the frame to facilitate a uniform fluid field and membrane hydration. The cell frame further comprises a protective plate comprising sealing features and lip extensions to prevent fluid leakage and membrane damage.

24 Claims, 9 Drawing Sheets

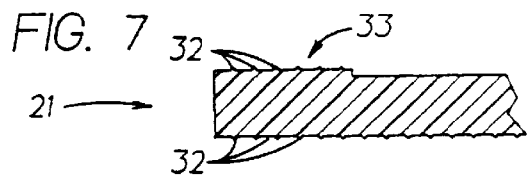
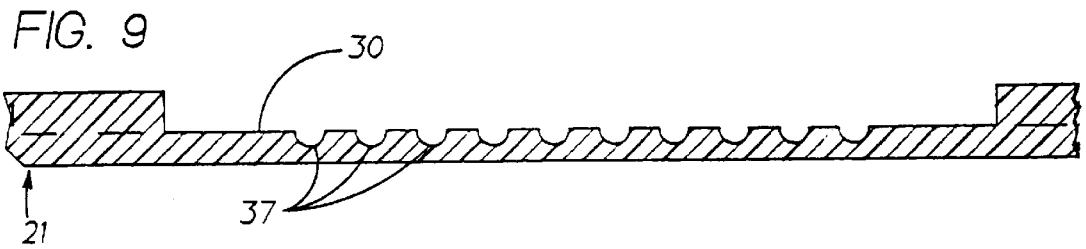
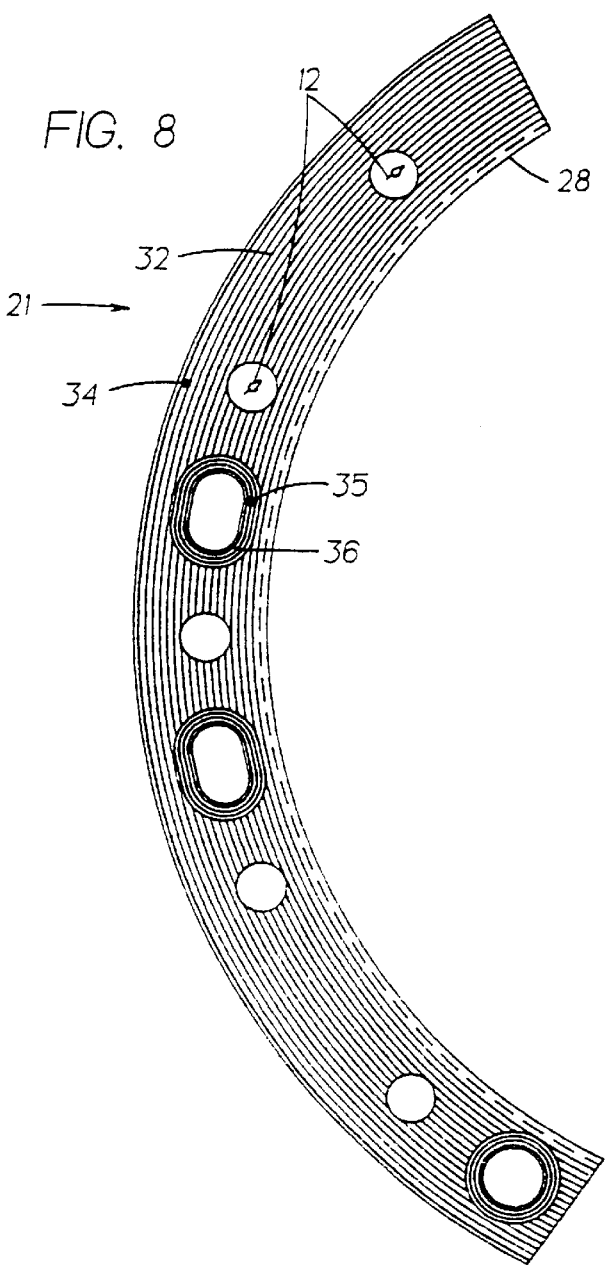

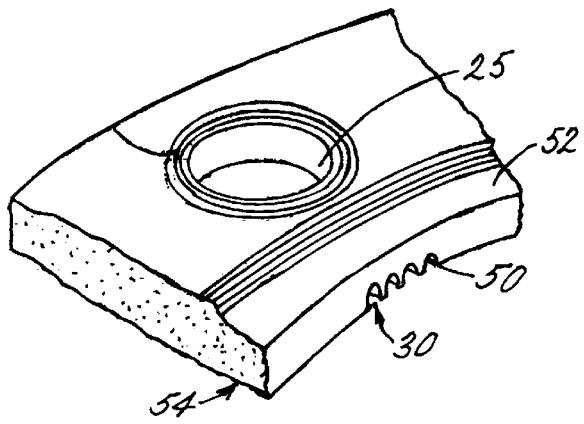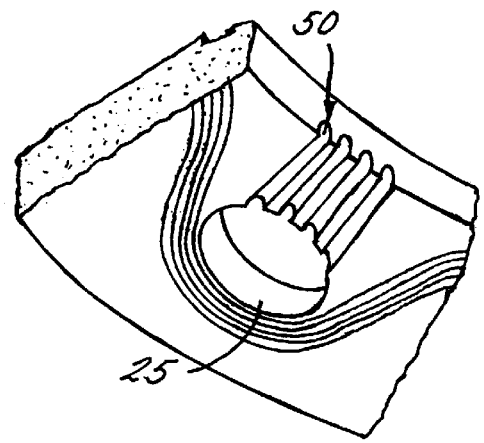
FIG. 15A
FIG. 15B
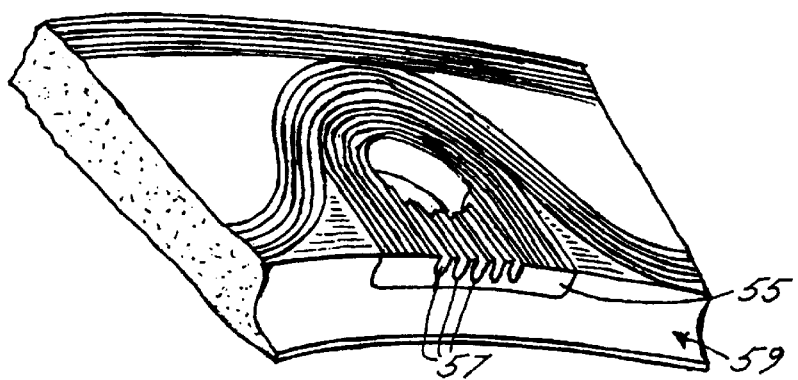
FIG. 14

ELECTROCHEMICAL CELL FRAME

CROSS REFERENCE OF RELATED APPLICATION

This application is a continuation-in-part of U.S. patent application Ser. No. 09/084,662, filed on May 26, 1998 (pending), which is hereby incorporated by reference.

BACKGROUND OF THE INVENTION

1. Field of the Invention

This invention relates generally to electrochemical cells. In particular, this invention relates to an improved frame for proton exchange membrane electrochemical cells that facilitates the movement of fluids and gases through the cell, thereby facilitating operation at high pressure and high fluid flow rates.

2. Brief Description of the Related Art

Electrochemical cells are energy conversion devices, usually classified as either electrolysis cells, fuel cells or batteries. The typical proton exchange membrane electrochemical cell stack includes a number of individual cells arranged in a stack with fluid, typically water flowing therein. The fluid is typically forced through the cells at high pressures. The cells within the stack are sequentially arranged including an anode, a proton exchange membrane, and a cathode. The anode/membrane/cathode assemblies are supported on either side by layers of screen or expanded metal which are in turn surrounded by cell frames and separator plates to form reaction chambers and to seal fluids therein. The cell frames are typically held together in the stack by tie rods passing through the frames and separator plates. End plates are mounted to the outside of the stack and together with the cell frames and tie rods function to react the pressure of the fluids operating within the stack. The frames include ports to communicate fluids from a source to the individual cells and also include additional ports to remove the fluids from the cells. The screens are used to establish flow fields within the reaction chambers to facilitate fluid transport, to maintain membrane hydration, provide mechanical support for the membrane, and provide a means of transferring electrons to and from electrodes.

A proton exchange membrane electrolysis cell, for example, functions as a hydrogen generator by electrolytically decomposing water to produce hydrogen and oxygen gas. Referring to FIG. 1, in a typical prior art single anode feed water electrolysis cell 101, process water 102 is reacted at oxygen electrode (anode) 103 to form oxygen gas 104, electrons, and hydrogen ions or protons 105. A portion of the process water containing some dissolved oxygen gas 102' and oxygen gas 104, exit the cell. The protons 105 migrate across a proton exchange membrane 108 to a hydrogen electrode (cathode) 107 where the protons 105 react with the electrons to form hydrogen gas 109. The hydrogen gas 109 and water 102" drawn across the membrane 108 by the protons (hydronium ions), exit from the cell through manifolds in the cell stack. Reactions for a typical electrolysis cell are as follows:

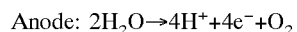

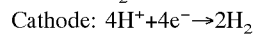

Anode: $2H_2O \rightarrow 4H^+ + 4e^- + O_2$

Cathode: $4H^+ + 4e^- \rightarrow 2H_2$

A typical fuel cell operates in the reverse manner as that described herein above for electrolysis cells. In a fuel cell, hydrogen, methanol, or other hydrogen fuel sources combine with oxygen, via the assistance of a proton exchange membrane, to produce electric power. Reactions for a typical fuel cell are as follows:

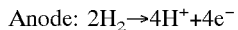

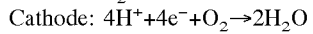

Anode: $2H_2 \rightarrow 4H^+ + 4e^-$

Cathode: $4H^+ + 4e^- + O_2 \rightarrow 2H_2O$

The cell frames which surround each of the cells within a stack typically contain multiple ports for the passage of reactant fluids. These ports are usually sealed by means of sealing ridges which are embossed, machined, or molded into the frame. The sealing features react against gaskets included in the stack to maintain fluid tight joints and also grip the gaskets to prevent creep and extrusion of the membrane. As is well known in the art and discussed in U.S. Pat. No. 5,441,621 to Molter et al., a common method of sealing utilizes ridges in concentric patterns around the ports and separate concentric patterns around the sealing area of the cell frame.

A common method for providing a fluid communication pathway between the reservoir, or active area, of a cell and individual fluid ports in the frame comprises manifolds machined into the frame. The manifolds typically comprise holes machined in the edge of the cell frames orthogonal to the ports. Fluids, after passing through the inlet ports and the holes in the manifolds, enter the screen packs, electrodes and membrane. The fluids and gas products similarly exit through outlet manifolds, sealed outlet ports, to collection tanks.

Existing cell frames have a number of drawbacks and disadvantages. For example, current technology uses protector rings to bridge the gap between the cell frame and screen packs. The protector rings, typically positioned about the perimeter of the frame, function to prevent membrane extrusion and "pinching" between the frame and the screen. Although these protector rings function well in operation, they render assembly of the cell very difficult, often breaking loose resulting in misalignment and possible damage to the membrane. Specifically, because of their small cross-section, the protector rings tend to slide out of position and as a result often do not cover the gap between the frame and the screen which they are intended to bridge.

Manufacture of conventional cell frames typically comprises injection molding of polymeric material. Although cell frames manufactured from polymeric materials function well in fuel cells, the fluid manifold details are difficult to machine. These details require drilling long, thin flow passages through the cell frame material. The drilling operations are expensive and usually very slow in order to prevent overheating and melting of the material. Fixturing the frame is difficult, and the process does not lend itself to any type of automation. FIG. 2 illustrates a typical fluid flow field 110 within a prior art cell frame 111. The flow field 110 is designed such that fluid 112 enters the cell through entrance manifold 113 located directly opposite outlet manifold 114 where fluid and products 115 exit the cell. This design, in conjunction with active area 116, of the typical cell, creates stagnant sections 117; sections of the cell where inadequate fluid flow occurs. Stagnant areas can cause poor fluid flux, membrane dehydration and overheating of that segment of the cell active area, which can result in cell failure and/or reduced cell life.

Different types of cells require different amounts of fluid flow. For instance, some cells, such as electrolysis cells which operate at high current density, require high flow rates of water to effect proper cell cooling, thereby necessitating a great number of manifolds with large flow areas to accommodate the fluid volume with minimal pressure drop. By contrast, in fuel cells, gaseous hydrogen and oxygen are supplied to the cell at stoichiometric rates, thereby requiring less manifold area in the cell frame. In addition, manifolds of differing capacity and position are frequently required for testing and for design capacity changes. Existing designs for electrochemical cells include large manifolds for flexibility in carrying these fluids. In order to maintain proper structural soundness in the sealing area, use of large manifolds requires large frame areas. This, in turn, requires that the application of a large axial load to the cell components in order to maintain component sealing, thereby significantly increasing the required end plate thickness and the size/strength of cell tie rods in order to minimize deflection under load.

Accordingly, there remains a need for cell frames which have leak-proof seals between the frame and the flow field, are less expensive to manufacture, provide optimal flow without stagnant areas, provide for flexibility in manifold size and positioning, and allow for high flow rates without the disadvantages attendant with using very large cell frames.

SUMMARY OF THE INVENTION

The above-described drawbacks and disadvantages of the prior art are alleviated by the cell assemblies in accordance with the present invention. The cell assembly of the present invention comprises: a cell frame, at least one port disposed through said cell frame for moving fluid through the cell, a cavity disposed on a side of the cell frame, said cavity having at least one conduit establishing fluid communication between the port and the interior of the cell frame.

Other embodiments of the present invention comprise: a cell frame having inlet and outlet ports disposed at a relative angular position of about 90°; a cell frame having at least one inlet port and at least one outlet port disposed at a relative angular position of about 180°; a cell frame having a beveled inner edge; and a cell assembly having a cell frame and a protector plate having a beveled inner edge.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 7 is a cross sectional view taken substantially along line 5—5 in FIG. 4 showing a lip and sealing features of the cell frame of the present invention;

FIG. 8 is a partial plan view of a cell frame showing fluid ports and sealing features;

FIG. 9 is a cross sectional view of a cell frame taken substantially along lines 7—7 in FIG. 4 showing an inlet cavity;

FIG. 14 is an angled top view of another embodiment of the present invention having the insert oriented such that the fluid passageways are disposed on the side of the cell frame opposite the membrane.

FIG. 15A is an angled top view of yet another embodiment of the present invention showing fluid passageways located directly on the cell frame; and FIG. 15B is an angled bottom view of the cell frame portion illustrated in FIG. 15A illustrating the location of the fluid passageways.

DETAILED DESCRIPTION OF THE PREFERRED EMBODIMENT

Figure 3:
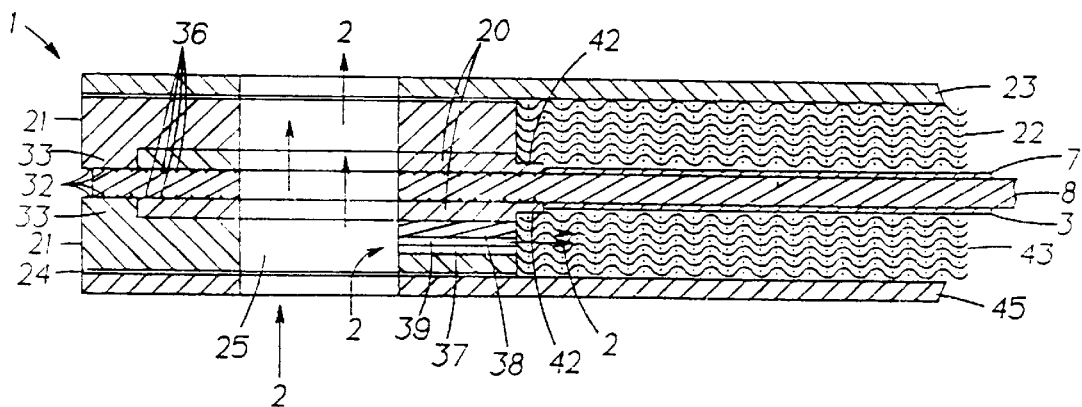
FIG. 3 is a cross sectional view of a partially assembled electrochemical cell taken substantially along a line through the center of an inlet port showing the relationship of the cell components.
Figure 4:
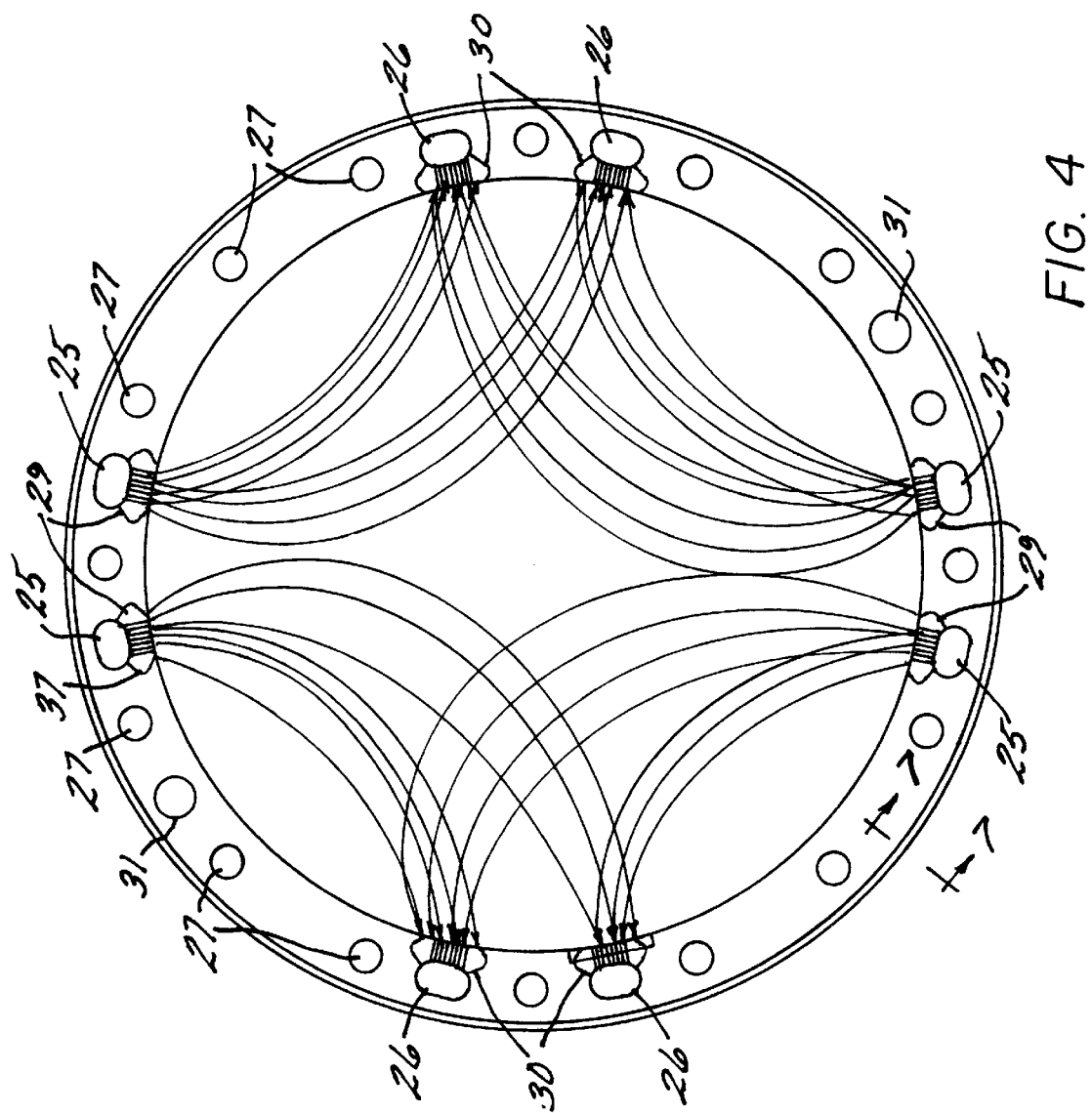
FIG. 4 is a top view of an embodiment of a cell frame of the present invention showing inlets, outlets and fluid flow field.

Referring to FIGS. 3 and 4, a cell, one embodiment of the present invention, includes proton exchange membrane 8 having an anode 3 and a cathode 7. The periphery of membrane 8 is installed between a pair of protector plates 20 and cell frames 21. Oxygen screen pack 43 is installed inside of protector plate 20 and cell frame 21 between oxygen separator plate 45 and oxygen anode 3. Hydrogen screen pack 22 is installed inside of protector plate 20 and cell frame 21 between hydrogen separator plate 23 and hydrogen cathode 7. The gaskets 24, frames 21, protector plates 20, membrane 8, and separator plates 23, 45 all include ports 25, 31 and mounting holes 27. Typically multiple cells 1 are arranged in an axial fashion with tie rods passing through mounting holes 27 to hold the cells in place between end plates. With the cells arranged in this manner inlet ports 25 in the individual components form separate conduits that provide fluid communication with a gas generator system.

Figure 5:
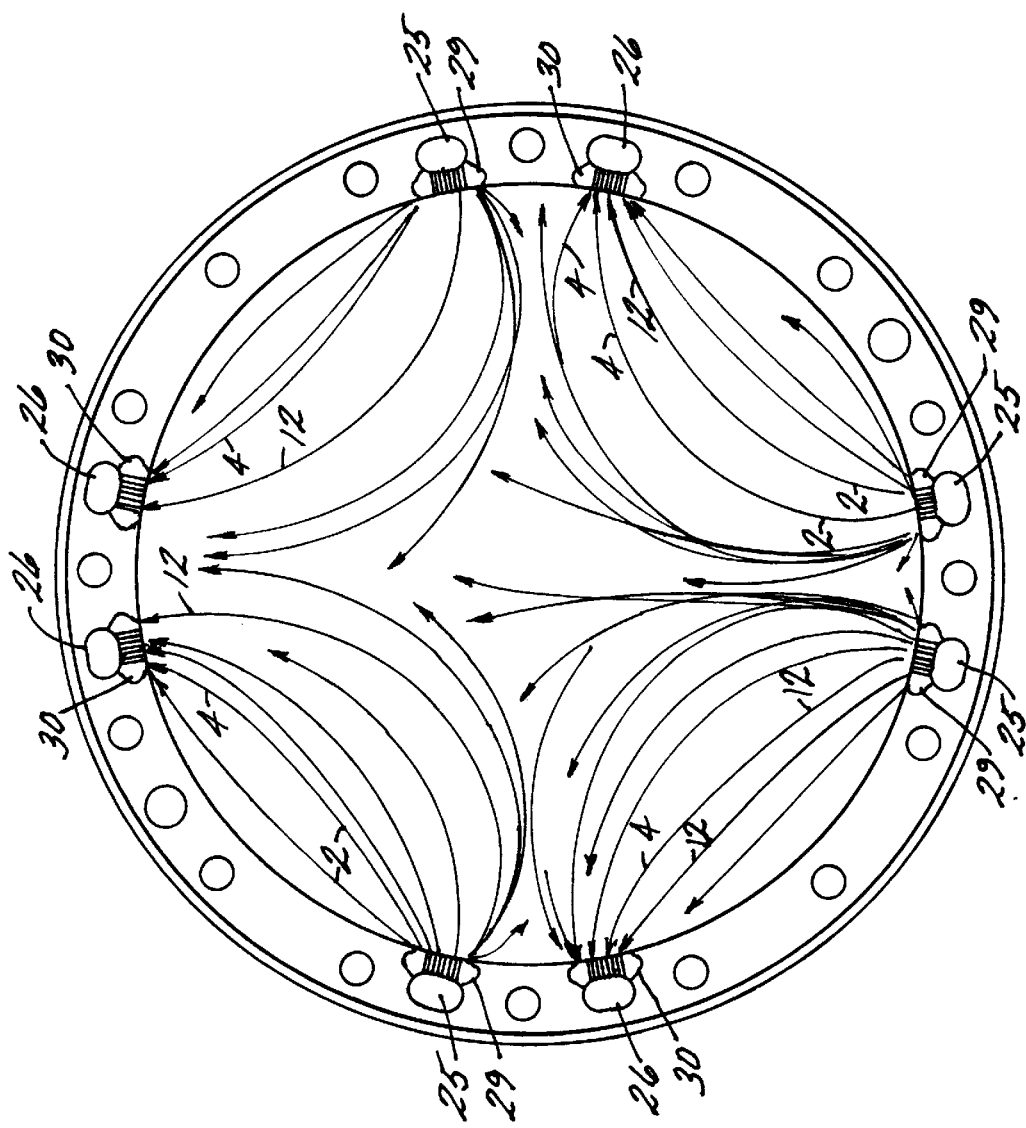
FIG. 5 is a top view of another embodiment of a cell frame of the present invention showing a different arrangement of inlets, outlets and flow field.

The cell frame 21 is shown in a configuration suitable for the oxygen side (anode) of an electrolysis cell and includes inlet manifold cavities 29, positioned at inlet ports 25 to facilitate the passage of process water to active area 16. Certain ports within cell frame 21 function as outlet ports 26 for exhausting fluids and oxygen gas from the active area. Process water 2 emerges from inlet ports 25, and reacts on the anode 3 to produce oxygen gas 4. The oxygen gas 4 and excess water 12 flow toward outlet manifold cavities 30 and (see FIG. 5) ports 26.

The ports 25, 26 are advantageously arranged as inlet and outlet ports which may be blocked off or connected in communication with each other to attain a substantially uniform flow field 10, void of stagnant areas. In one arrangement, the inlet ports 25, are oriented on opposite sides of the frame from one another, while outlet ports 26, similarly located on opposite sides of the frame, are located orthogonal to the flow from the inlet ports 25. In other words, the inlet ports are located at 12 o'clock and 6 o'clock, while the outlet ports are located at about 3 o'clock and 9 o'clock. (see FIG. 4) Referring to FIG. 5, a similar embodiment comprises double inlet ports 25 disposed on one side of the cell frame, double outlet ports 26 disposed on the opposite side of the cell frame, with an inlet port 25 and an outlet port 26 disposed approximately halfway around the cell frame between the double inlet ports and double outlet ports, with a similar inlet port and outlet port arrangement on the opposite side of the cell frame again, about half way between the double outlet ports and double inlet ports. Note, it is understood and anticipated that numerous arrangements with the inlet and outlet ports evenly and otherwise distributed around the cell frame can also be employed.

Figure 1:
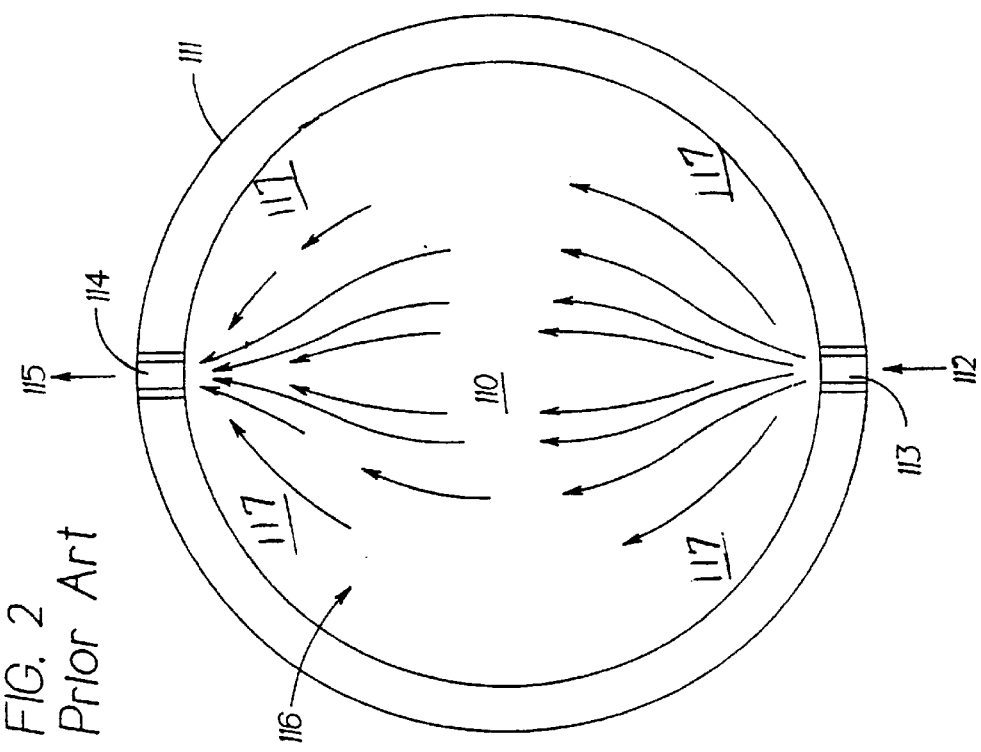
FIG. 1 is a schematic diagram of a prior art electrochemical cell showing the electrochemical reaction.
Figure 2:
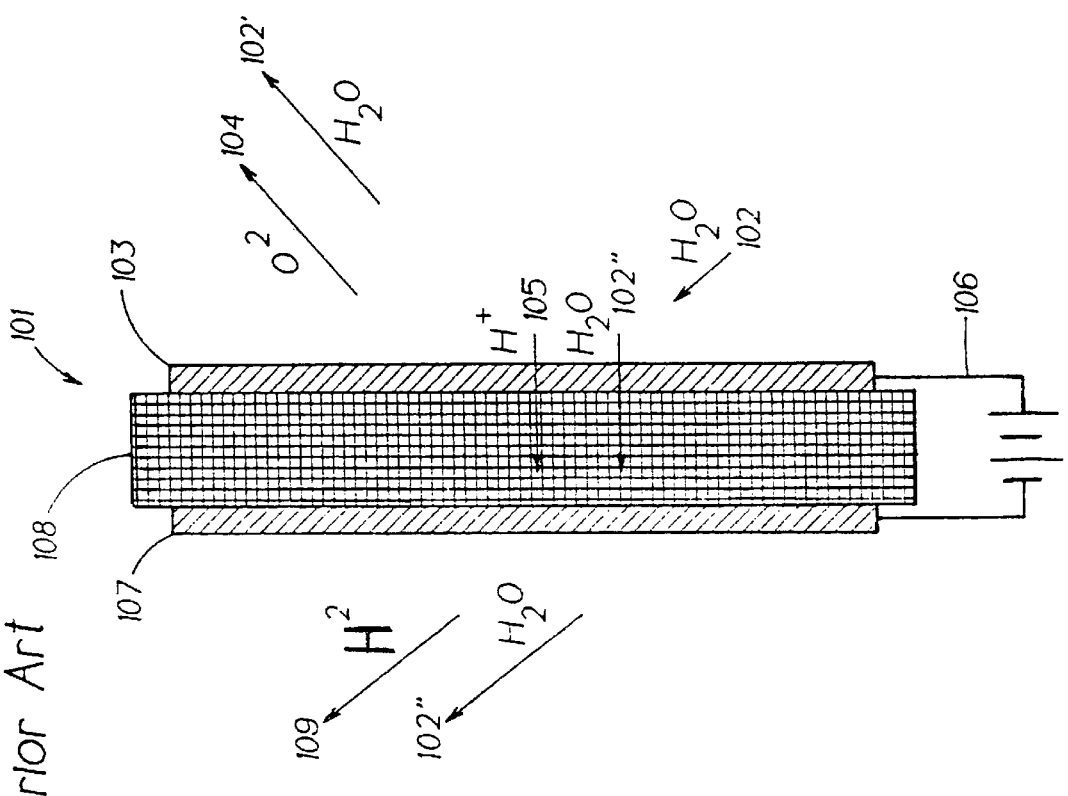
FIG. 2 is a schematic representation of a electrochemical cell of the prior art showing the fluid flow field and areas of stagnation.
Figure 6:
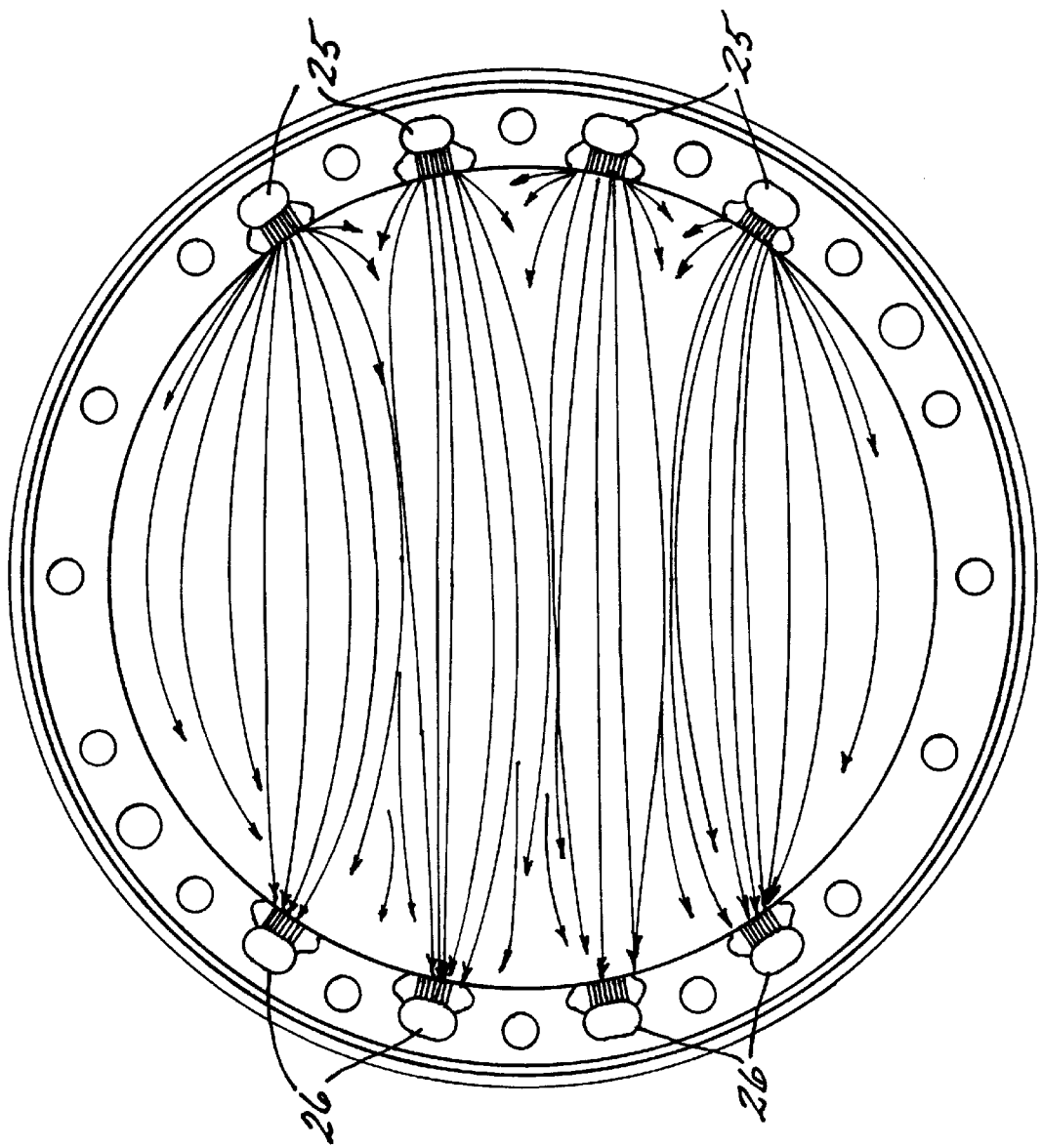
FIG. 6 is a top view of a further embodiment of a cell frame of the present invention showing a different arrangement of inlets, outlets and flow field.

In this particular configuration the stagnant areas of the prior art are eliminated. In another embodiment, multiple inlet ports, preferably about 4, are located on one side of the cell frame while multiple outlet ports are located on the substantially opposite side of the cell frame (see FIG. 6). This arrangement reduces pressure drop while improving the flow field. In a particularly preferred embodiment, ports would be located substantially around the periphery of the cell frame, i.e., about ten or more ports. The ports employed as inlet ports, outlet ports, and those merely blocked off would be determined according to the particular application with the blocked-off ports being blocked off using the manifolds and inserts described below. An alternative embodiment includes an additional pair of ports positioned in frame 21 in proximity to stagnation area 117 (see FIG. 2). In this particular configuration, the additional ports are connected as inlet ports and provide a low pressure drop fluid shunt to cause additional fluid to flow through the interconnected ports, further hydrating the membranes in this region.

Additionally, various geometry ports can be used to transport the various volumes of fluids without adjustment of the frame width. The preferred port shape is dependent upon the necessary volume flow rate of the fluid and cell size limitation. For example, ports 25, 26 preferably have an elongated geometry, such as oval or the like, to accommodate the high fluid volume of water and oxygen, while hydrogen ports 31 which require a lower flow rate are typically circular.

In addition to the manifold cavities 29, the ports 25, 26, 31, cell frame 21 further includes frame seal ridges 32. Although seal ridges can be positioned across the cell frame as is shown in relation to the opposite side of the cell frame 21, it is preferred to employ a rib 33, with sealing ridges 32 positioned on rib 33 (see FIG. 7). The rib 33 functions as a support to hold a protector plate in place within the cell frame during assembly of a cell stack. An embodiment of the opposite side of cell frame 21, comprises a frame sealing area 34 also having frame seal ridges 32, preferably positioned in a concentric pattern about the circumference of the frame, and port seal areas 35 having port seal ridges 36, preferably positioned in concentric patterns about the ports (see FIG. 8). Once assembled and during operation, the seal ridges 32 establish a fluid tight seal, thereby preventing leaking of fluid from the ports. Preferably, these frame seal ridges comprise less than about 50%, with the valleys and any non-ridged area comprising the balance of the surface area of that side of the cell frame. The size of the ridges can be any conventional size capable of forming a fluid tight seal, with a depth (from the top of a ridge to the bottom of a valley) of about 0.001 inches to about 0.004 inches preferred.

Similar to ports 25, 26, manifold areas 29, 30 preferably comprise a cavity having manifold fluid passageways, grooves 37, as is shown in greater detail in FIG. 9. Manifold areas 29, 30 can be adapted with a cavity to receive removable manifold inserts 38 which include insert grooves 39 disposed laterally therein (see FIGS. 10A and 10B). In one embodiment of the present invention, manifold grooves 37 align with insert grooves 39 to form substantially round manifold passages allowing fluid communication between port 25 and active area 16. Note, these passages can have any geometry capable of creating laminar flow with, preferably, substantially no stagnant areas.

Figure 11A:
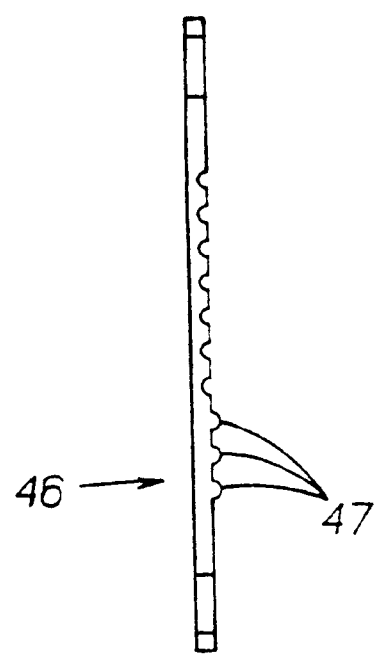
FIG. 11A is a plan view of an embodiment of a manifold insert of the present invention.
Figure 11B:
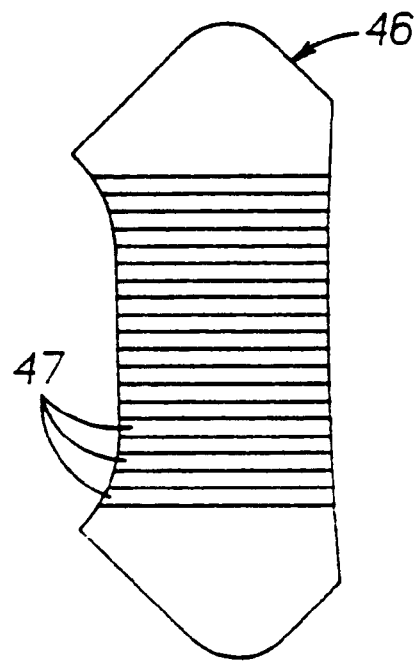
FIG. 11B is a side view of the manifold insert of FIG. 11A showing the blocking ribs and insert grooves according to the present invention.

Referring to FIGS. 11A and 11B, alternative inserts 46 include one or more protrusion, e.g., blocking ribs 47 in certain insert groove locations so that upon positioning the inserts 46 in the cavity, blocking ribs 47 block selective manifold cavity grooves 37, thereby reducing the manifold capacity. Blocking ribs can be employed to block any combination or all of the fluid passageways.

Figure 12A:
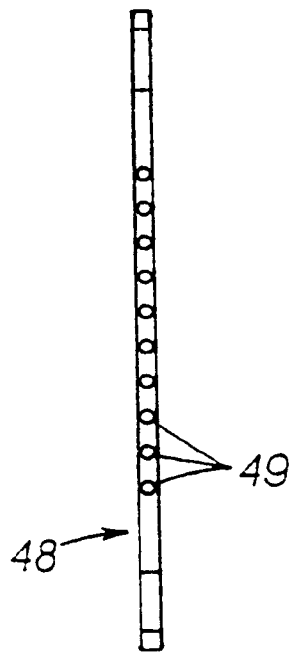
FIG. 12A is a plan view of an embodiment of a manifold insert of the present invention.
Figure 12B:
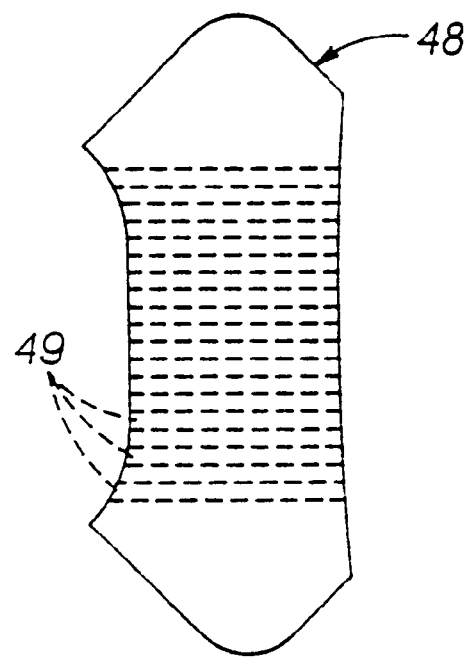
FIG. 12B is a side view of the manifold insert of FIG. 12A showing the fluid passageways according to the present invention.

Referring to FIGS. 12A and 12B, still other embodiments of manifold insert 48 include complete fluid passageways 49 passing completely therethrough. It is within the scope of the present invention that manifold insert 48 have fluid passageways 49 (or grooves) of various capacities, geometries, and numbers disposed therein or to have no fluid passageways, such that insert 48 becomes a blank to completely block off fluid communication between a port and the active area. The manifold insert of these alternative embodiments are utilized with inlet and outlet manifold cavities manufactured without manifold features but are adapted to removably receive the alternative embodiments of manifold inserts. In this particular embodiment the capacity and location of the inlet and outlet manifolds can be readily varied by varying the type and placement of the alternative inserts.

Figure 10B:
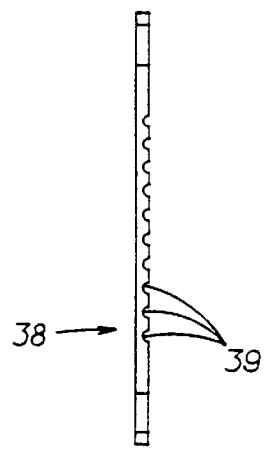
FIG. 10B is a side view of the manifold insert of FIG. 10A showing the insert grooves according to the present invention.
Figure 10A:
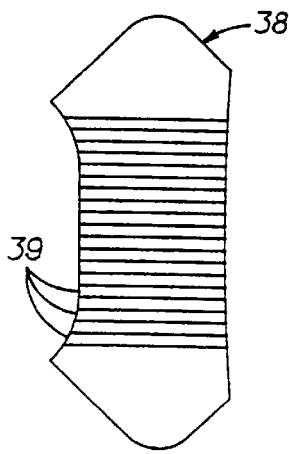
FIG. 10A is a plan view of a manifold insert of the present invention.

In yet another embodiment of the present invention, the manifold insert 38 of FIGS. 10A and 10B are inserted into manifold areas which do not contain manifold features (i.e. do not contain grooves) such that side 41 insert 38 is in intimate contact with the manifold area 30. In this embodiment, the grooves 39 create substantially semi-circular conduits enabling fluid communication between the ports and the active area. This embodiment is further illustrated in FIG. 14 with insert 55 having grooves 57 and a beveled edge 59.

In a similar embodiment shown in FIGS. 15A and 15B, grooves 50 are disposed directly and integral with the manifold area 30, without the use of inserts. In this embodiment, in order to prevent the membrane from extruding or otherwise being forced into the grooves 50, the membrane is preferably located on side 52 of the cell frame, opposite the side 54 containing the grooves 50. In this arrangement, the grooves 50, which, as the grooves described above, can be of any quantity, size, and geometry based upon the given application, provide fluid communication between the port 25 and the active area of the cell.

Figure 13:
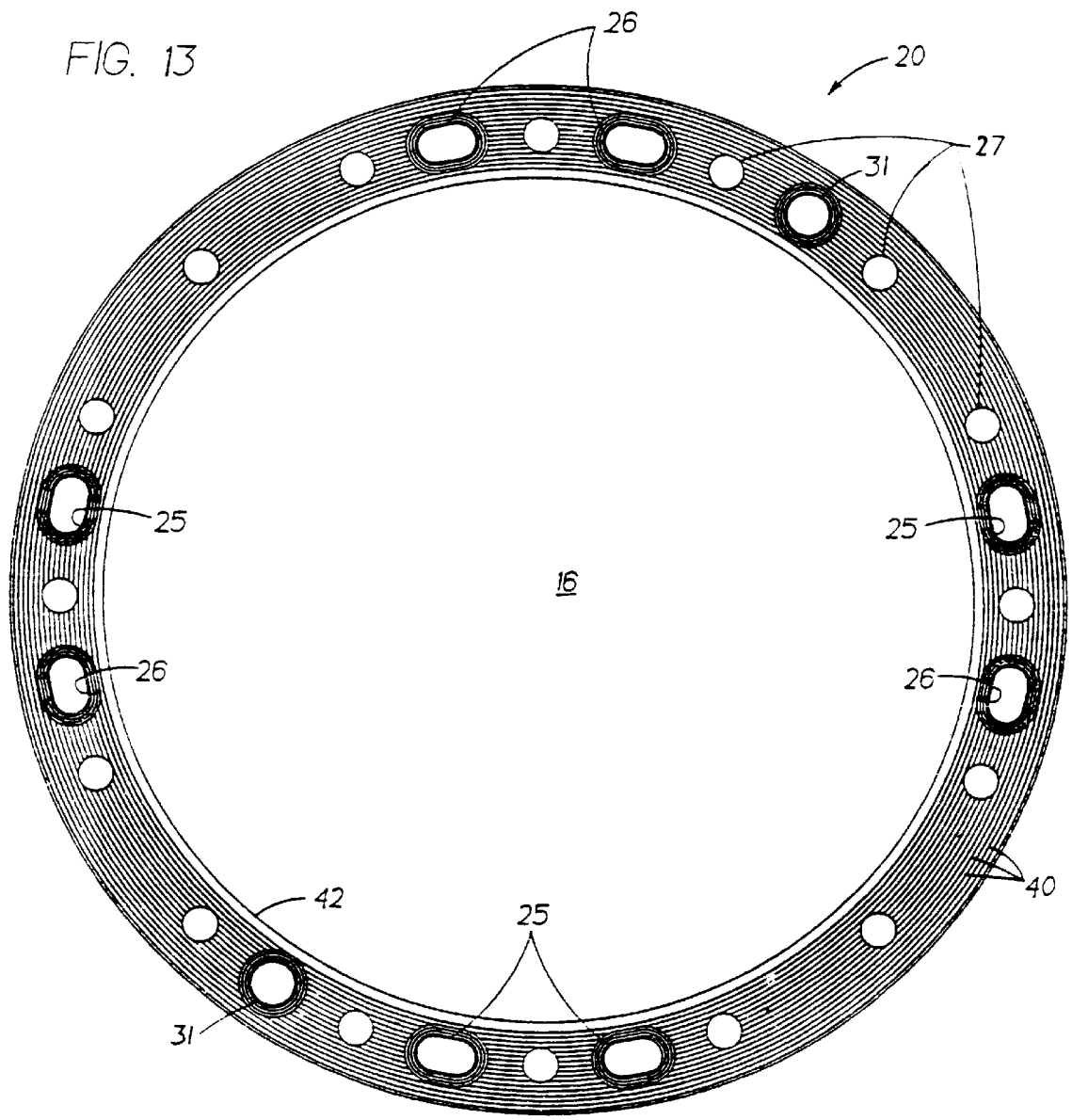
FIG. 13 is a plan view of a protector plate according to the present invention showing sealing features and protective bridge.

Referring now to FIG. 13 there is shown protector plate 20, water ports 25, 26, mounting holes 27 and hydrogen ports 31. The holes 27 and ports 25, 26, 31 align with the holes 27 and ports 25, 26, 31 included in the cell frame described hereinabove, when assembled. Protector plate 20 further includes plate sealing ridges 40 and protector ridge 42, which can be beveled.

The operation of an inlet port 25 is described with reference to FIG. 3 which shows a cross section of a partial assembly of a cell taken through the center of inlet port 25. The cell 1 is assembled by positioning manifold insert 38 in cell frame 21 such that manifold groove 37 is axially aligned with insert groove 39. Protector plate 20 is then positioned inside of rib 33 on ledge 19 and preferably held in frame 21 during assembly by an adhesive material such as epoxy or by ultrasonic welding. Oxygen screen pack 43 is installed inside the active area of the frame assembly, within protective ridge 42 of the protector plate 20, which prevents the edge of the screen packs 43, 22 from pinching membrane 8 and prevents the membrane 8 from extruding into the edges of the screen packs. Gasket 24 is held in place against sealing ridges 32 by a similar adhesive. As stated above, sealing ridges 32, in combination with gasket 24, creates a fluid tight seal which prevents leaks from port 25. Anode 3, membrane 8 and cathode 7 are then installed within frame 21. The same sequence is followed assembling the hydrogen side components. Note, additional conventional components such as shims, flat plates, gaskets, etc., can also be used.

In operation, process water 2 enters port 25 and a portion is diverted into a fluid communication channel comprised of manifold groove 37 and insert groove 39. A portion of process water 2, not diverted into the grooves 37, 39, continues along conduit 25 formed by axially aligned holes in the components, and enters subsequent cells in the cell stack positioned outside of the cell 1 shown. The process water diverted into the manifold is channeled through screen pack 43 and into anode 3 where the electrochemical reactions take place. As discussed herein earlier, the reaction is facilitated by electrical potential applied across the anode 3 and cathode 7, thereby producing oxygen gas. The oxygen gas and a portion of the process water exit the cell through similar manifold and porting arrangements positioned elsewhere along the inside periphery of the frame.

Protons and water, in the form of hydronium ions, migrate across the membrane to cathode 7 where hydrogen gas forms. The hydrogen gas and electro-osmotically dragged water also exit the cell through a similar manifold and porting arrangement.

The electrochemical cell frame having the above-described features enables low cost manifolding, good flow distribution with high fluids flow rates, low end plate loading and enhanced protection from screen pack induced membrane damage. Due to the flexibility provided by the inserts, a single cell frame design can be used in numerous applications having different flow rate and/or flow field requirements, while the simplicity of manufacture provided by the integral fluid passageway design illustrated in FIGS. 15A and 15B reduces manufacturing costs. Furthermore, this arrangement avoids membrane failures induced by the fluid passageways by locating those passageways on the side of the cell frame opposite the membrane side.

While preferred embodiments have been shown and described, various modifications and substitutions may be made thereto without departing from the spirit and scope of the invention. Accordingly, it is to be understood that the present invention has been described by way of illustration and not limitation.

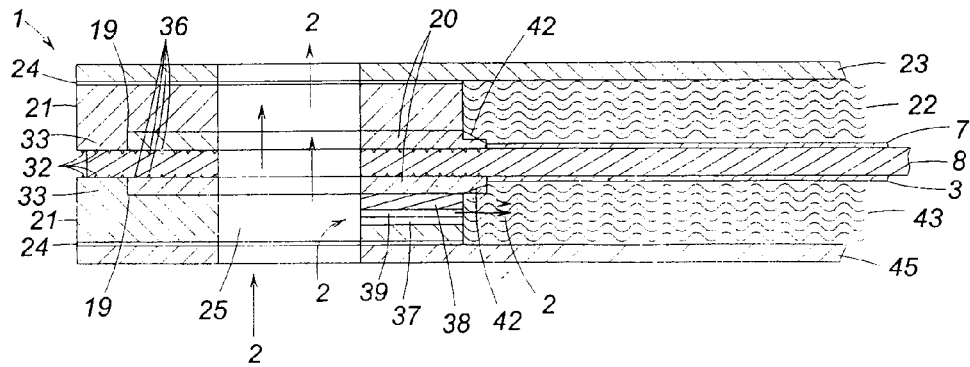

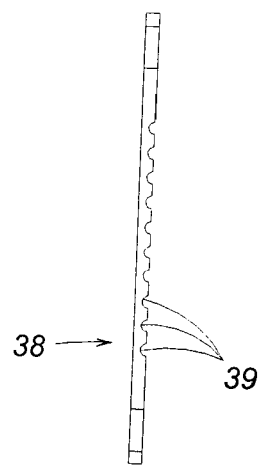
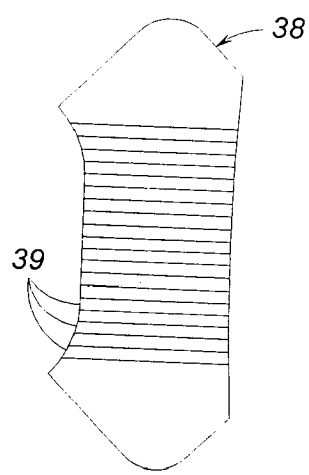
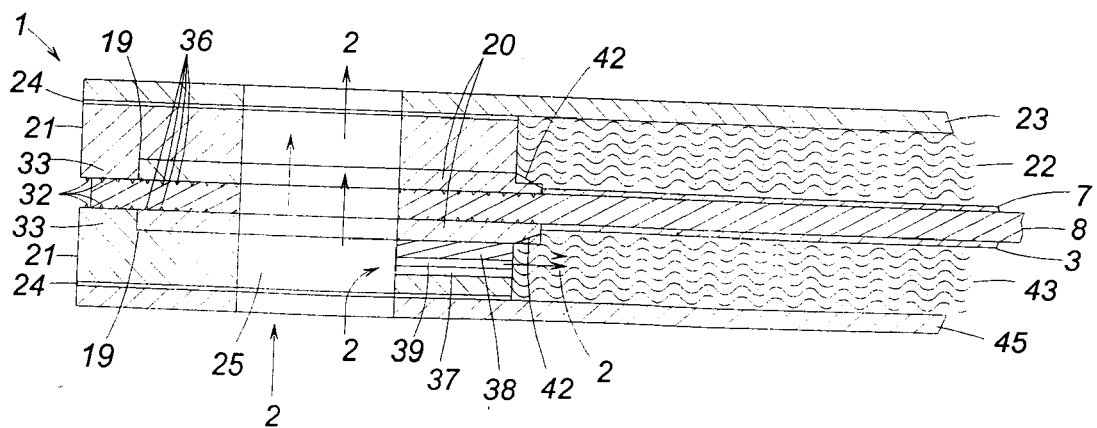

What is claimed is:

1. A cell assembly for use in an electrochemical cell, comprising:

the cell assembly having a cell frame, said cell frame having an interior, an inner edge with an inner thickness, an outer edge with an outer thickness, and a width, wherein said interior comprises a beveled edge;

at least one port disposed through said cell frame for moving fluid through the cell;

at least one first fluid passageway disposed on a first side of said cell frame between said port and said interior, said first fluid passageway establishing fluid communication between said port and said interior; and a second side of said cell frame for orientation in intimate contact with a membrane.

2. A cell assembly as in claim 1, wherein said second side has a surface area and comprises sealing ridges which occupy less than about 50% of said surface area.

3. A cell assembly as in claim 1, further comprising sealing ridges having a depth, from the top of said ridges to the bottom of valleys formed thereby of about 0.001 to about 0.004 inches.

4. A cell assembly as in claim 1, wherein said beveled edge is disposed on said second side.

5. A cell assembly for use in an electrochemical cell, comprising:

the cell assembly having a cell frame, said cell frame having an interior, an inner edge with an inner thickness, an outer edge with an outer thickness, and a width;

at least one port disposed through said cell frame for moving fluid through the cell;

at least one first fluid passageway disposed on a first side of said cell frame between said port and said interior, said first fluid passageway establishing fluid communication between said port and said interior; and a second side of said cell frame for orientation in intimate contact with a membrane, wherein said second side comprises a ledge disposed about the interior of said second side for receiving a protector plate.

6. A cell assembly as in claim 5, further comprising said protector plate having a periphery and a beveled inner edge wherein when said protector plate is assembled with said cell frame, said beveled inner edge extending beyond the inner edge of the cell frame.

7. A cell assembly as in claim 6, wherein said cell frame further comprises a cavity disposed on said first side, between said port and said interior, and an insert disposed within said cavity, said insert having a size and geometry substantially equivalent to said cavity size and geometry.

8. A cell assembly as in claim 7, wherein said insert has at least one insert fluid passageway disposed in said insert, such that when said insert is disposed within said cavity, said insert fluid passageway establishes fluid communication from said port to said interior.

9. A cell assembly as in claim 8, wherein said insert fluid passageway is said first fluid passageway which is a groove, channel, conduit, or combination thereof.

10. A cell assembly as in claim 8, wherein said cavity has a first fluid passageway such that when said insert is disposed within said cavity, said insert fluid passageway in combination with said first fluid passageway establishes fluid communication between said port and said interior.

11. A cell assembly as in claim 7, wherein said cavity has said first fluid passageway and said insert has at least one protrusion such that when said insert is disposed within said cavity, said protrusion aligns with and blocks at least one of said first fluid passageways.

12. A cell assembly as in claim 11, wherein said insert has a plurality of protrusions which block said first fluid passageways, inhibiting fluid movement between said port and said interior.

13. A cell assembly as in claim 7, wherein said insert is substantially solid, preventing fluid passage from said port to said interior.

14. A cell assembly for use in an electrochemical cell, comprising:
  said cell assembly having a cell frame, said cell frame having an interior, an inner edge with an inner thickness and an outer edge with an outer thickness and a width, wherein said cell frame outer thickness is greater than said inner thickness such that said cell frame has a concentric, annular rib abutting said outer edge;
  at least one port disposed through said cell frame for moving fluid through the cell;
  at least one first fluid passageway disposed on a first side of said cell frame between said port and said interior, said first fluid passageway establishing fluid communication between said port and said interior.

15. A cell assembly for use in an electrochemical cell, comprising:
  the cell assembly having a cell frame, said cell frame having an interior, an inner edge with an inner thickness, an outer edge with an outer thickness, and a width;
  at least one inlet port and at least one outlet port disposed through said cell frame for moving fluid through the cell, wherein said inlet port and said outlet port are disposed at a relative angular position of about 90° from a center point of said cell frame; and
  at least one first fluid passageway disposed on a first side of said cell frame between said inlet port and said interior, said first fluid passageway establishing fluid communication between said inlet port and said interior.

16. A cell assembly for use in an electrochemical cell, comprising:
  the cell assembly having a cell frame, said cell frame having an interior, an inner edge with an inner thickness, an outer edge with an outer thickness, and a width,
  a plurality of inlet ports and outlet ports disposed through said cell frame for moving fluid through the cell, said inlet ports and outlet ports disposed at a relative angular position of about 180° from said center point such that a first fluid flowing from one of said inlet ports to one of said outlet ports, across said interior, flows substantially parallel to said first fluid flowing from another of said inlet ports to another of said outlet ports; and
  at least one first fluid passageway disposed on a first side of said cell frame between at least one of said inlet port or said outlet port, and said interior, said first fluid passageway establishing fluid communication between said inlet port or said outlet port and said interior.

17. An electrochemical cell, comprising:
  a first and a second cell frame each having an interior, at least one inlet port, and at least one outlet port;
  a membrane having an anode electrode side and a cathode electrode side, said anode electrode side disposed adjacent to said first cell frame adjacent and in intimate contact with a first protector medium, said first protector medium having a beveled inner edge to inhibit a first screen disposed within said first cell frame adjacent to said membrane from pinching said membrane between said first screen and said first cell frame; said cathode electrode side disposed adjacent to said second cell frame adjacent and in intimate contact with a second protector medium, said second protector medium having a beveled inner edge to inhibit a second screen disposed within said second cell frame adjacent to said membrane from pinching said membrane between said second screen and said second cell frame.

18. An electrochemical cell as in claim 17, further comprising:
  an inlet cavity and an outlet cavity disposed adjacent to said inlet port and said outlet port, respectively;
  an inlet insert disposed in said inlet cavity and creating fluid communication between said inlet port and said interior; and
  an outlet insert disposed in said outlet cavity creating communication between said interior and said outlet port.

19. An electrochemical cell as in claim 18, wherein:
  at least one inlet fluid passageway is defined in said inlet cavity or said inlet insert, said inlet insert disposed within said inlet cavity such that said inlet fluid passageway establishes fluid communication between said inlet port and said interior; and
  at least one outlet fluid passageway is defined in said outlet cavity or said outlet insert, said outlet insert disposed within said outlet cavity such that said outlet fluid passageway establishes fluid communication between said interior and said outlet port.

20. An electrochemical cell as in claim 18, wherein said inlet insert has at least one fluid passageway disposed within said inlet insert, such that when said inlet insert is disposed within said inlet cavity, said fluid passageway establishes fluid communication between said inlet port and said interior.

21. An electrochemical cell as in claim 18, wherein said outlet insert has at least one fluid passageway disposed within said outlet insert, such that when said outlet insert is disposed within said outlet cavity, said fluid passageway establishes fluid communication between said outlet port and said interior.

22. An electrochemical cell as in claim 17, wherein said cell frame has a surface area on a side of said frame having said protector medium and further comprising sealing ridges which occupy less than about 50% of said surface area.

23. An electrochemical cell as in claim 22, wherein said sealing ridges have a depth, from the top of said ridges to the bottom of valleys formed thereby of about 0.001 to about 0.004 inches.

24. An electrochemical cell, comprising:
  a first and a second cell frame each having an interior, a membrane side, at least one inlet port, and at least one outlet port, and a fluid passageway disposed on a side opposite said membrane side;
  a membrane having an anode electrode side and a cathode electrode side, said anode electrode side disposed adjacent to and in intimate contact with said first cell frame membrane side; said cathode electrode side disposed adjacent to and in intimate contact with said second cell frame membrane side,
  wherein each of said first and said second cell frames further comprises a protector medium having a beveled inner edge to inhibit a screen disposed within each of said first and said second cell frames, adjacent to and in intimate contact with said membrane, from pinching said membrane between said screen and said cell frame.

* * * * *

UNITED STATES PATENT AND TRADEMARK OFFICE
CERTIFICATE OF CORRECTION

PATENT NO. : 6,117,287
DATED : September 12, 2000
INVENTOR(S) : Molter et al.

It is certified that error appears in the above-identified patent and that said Letters Patent is hereby corrected as shown below:

Replace title page with the attached title page.

Title page,
Item [56], References Cited, U.S. PATENT DOCUMENTS, insert
-- 5,434,022    7/1995  Anani et al …. 429/218 --

Drawings,
Figure 3, substitute with the attached

Column 1,
Line 7, after "09/084,662," delete "filed on May 26, 1998 (pending)" and insert therefor -- Attorney Docket No. 97-1785 --

Column 4,
Line 55, before "cavities" delete "inlet manifold" and insert therefor -- manifold inlet --
Line 62, delete "(see FIG. 5)ports 26" and insert therefor -- ports 26 (see FIG. 5). --

Signed and Sealed this

Seventh Day of September, 2004

JON W. DUDAS
*Director of the United States Patent and Trademark Office*

United States Patent [19]

Molter et al.

[11] Patent Number: 6,117,287
[45] Date of Patent: *Sep. 12, 2000

[54] ELECTROCHEMICAL CELL FRAME

[75] Inventors: Trent M. Molter, Glastonbury; Lawrence C. Moulthrop, Jr., Windsor; Robert J. Friedland, Enfield; Mark E. Dristy, Manchester, all of Conn.

[73] Assignee: Proton Energy Systems, Inc., Rocky Hill, Conn.

[*] Notice: This patent is subject to a terminal disclaimer.

[21] Appl. No.: 09/223,609

[22] Filed: Dec. 30, 1998

Related U.S. Application Data

[63] Continuation-in-part of application No. 09/084,662, May 26, 1998.
[51] Int. Cl.[7] .................................................. C25D 3/56
[52] U.S. Cl. .......................... 204/255; 204/257; 204/279
[58] Field of Search ................................. 204/252, 253, 204/255, 256, 257, 258, 263, 265, 266, 279; 205/687

[56] References Cited

U.S. PATENT DOCUMENTS

| | | | |
|---|---|---|---|
| 3,134,697 | 5/1964 | Niedrach | 136/86 |
| 3,297,484 | 1/1967 | Niedrach | 136/86 |
| 4,039,409 | 8/1977 | LaConti et al. | 204/129 |
| 4,124,478 | 11/1978 | Tsien et al. | 204/255 |
| 4,166,143 | 8/1979 | Petrow et al. | 427/115 |
| 4,210,512 | 7/1980 | Lawrance et al. | 204/257 |
| 4,214,969 | 7/1980 | Lawrance et al. | 204/255 |
| 4,233,146 | 11/1980 | Rothmayer et al. | 204/255 |
| 4,272,353 | 6/1981 | Lawrance et al. | 204/283 |
| 4,371,433 | 2/1983 | Balko et al. | 204/228 |
| 4,588,660 | 5/1986 | Shimizu et al. | 429/35 |
| 4,822,460 | 4/1989 | Beaver | 204/98 |
| 5,019,227 | 5/1991 | White et al. | 204/128 |
| 5,173,633 | 12/1992 | Joo et al. | 313/270 |
| 5,187,025 | 2/1993 | Kelland et al. | 429/33 |
| 5,296,109 | 3/1994 | Carlson et al. | 204/129 |
| 5,316,644 | 5/1994 | Titterington et al. | 204/284 |
| 5,324,565 | 6/1994 | Leonida et al. | 428/131 |
| 5,366,823 | 11/1994 | Leonida et al. | 429/34 |
| 5,372,689 | 12/1994 | Carlson et al. | 204/252 |
| 5,441,621 | 8/1995 | Molter et al. | 204/252 |
| 5,466,354 | 11/1995 | Leonida et al. | 204/252 |
| 5,470,448 | 11/1995 | Molter et al. | 204/252 |
| 5,484,512 | 1/1996 | Sasaki et al. | 204/129 |

OTHER PUBLICATIONS

"SPE Water Electrolyzers for Closed Environment Life Support" by J.F. McElroy, T.M. Molter and R.J. Roy (2 pages).

"SPE Hydrogen/Oxygen Fuel Cells for Rigorous Naval Applications" by J.F. McElroy, T.M. Molter and R.N. Sexauer (5 pages).

24th Intersociety Energy Conversion Engineering Conference, IECEC–89, "Development of Low Cost, Carbon–Supported Carbon Monoxide Tolerant Catalysts for Phosphoric Acid and Proton Exchange Membrane Fuel Cell Systems" by J. Kosek, N. Kackley and A. LaConti, pp. 1581 through 1586, no month/year given.

J. Electrochem Soc., vol. 141, No. 8, Aug. 1994, "Mass Transport Phenomena in Proton Exhange Membrane Fuel Cells Using O2/He, O2/Ar, and O2/N2 Mixtures, 1. Experiemental Analysis" pp. 2084 through 2088.

J. Electrochem Soc., vol. 141, No. 8, Aug. 1994, "Mass Transport Phenomena in Proton Exchange Membrane Fuel Cells Using O2/He, O2/Ar, and O2/N2 Mixtures, II. Theoretical Analysis" pp. 2089 through 2096.

*Primary Examiner*—Kathryn Gorgos
*Assistant Examiner*—Thomas H Parsons
*Attorney, Agent, or Firm*—Cantor Colburn LLP

[57] ABSTRACT

A cell frame is for use in an electrochemical cell wherein the cell frame includes fluid communicating inserts for providing process water to the electrochemical cell and to transport waste water and product from the cell. The cell frame comprises inserts positioned about the periphery of the frame to facilitate a uniform fluid field and membrane hydration. The cell frame further comprises a protective plate comprising sealing features and lip extensions to prevent fluid leakage and membrane damage.

24 Claims, 9 Drawing Sheets